United States Patent
Chew

(10) Patent No.: US 9,469,539 B2
(45) Date of Patent: Oct. 18, 2016

(54) METHOD FOR CARBONIZING CARBON DIOXIDE AND APPLICATION THEREOF

(75) Inventor: Hwee Hong Chew, Singapore (SG)

(73) Assignee: ECOSPEC GLOBAL TECHNOLOGY PTE LTD., Singapore (SG)

( * ) Notice: Subject to any disclaimer, the term of this patent is extended or adjusted under 35 U.S.C. 154(b) by 46 days.

(21) Appl. No.: 14/235,959

(22) PCT Filed: Sep. 2, 2011

(86) PCT No.: PCT/CN2011/079288
§ 371 (c)(1),
(2), (4) Date: May 30, 2014

(87) PCT Pub. No.: WO2013/029275
PCT Pub. Date: Mar. 7, 2013

(65) Prior Publication Data
US 2014/0255290 A1    Sep. 11, 2014

(51) Int. Cl.
| | | |
|---|---|---|
| *C01B 31/02* | (2006.01) | |
| *C01B 13/02* | (2006.01) | |
| *C01B 31/24* | (2006.01) | |
| *B01J 19/12* | (2006.01) | |

(52) U.S. Cl.
CPC .......... *C01B 31/0206* (2013.01); *B01J 19/12* (2013.01); *C01B 13/0203* (2013.01); *C01B 31/02* (2013.01); *C01B 31/24* (2013.01)

(58) Field of Classification Search
CPC .......................... C01B 31/02; C01B 31/0206
See application file for complete search history.

(56) References Cited

U.S. PATENT DOCUMENTS

| | | | |
|---|---|---|---|
| 4,399,111 A * | 8/1983 | Baur et al. | 423/226 |
| 4,440,731 A | 4/1984 | Pearce | |
| 2007/0148069 A1 | 6/2007 | Chakravarti et al. | |
| 2009/0211899 A1* | 8/2009 | Niioka | 204/194 |

FOREIGN PATENT DOCUMENTS

| | | |
|---|---|---|
| CN | 1956917 | 5/2007 |
| CN | 101279181 | 10/2008 |
| CN | 101903089 | 12/2010 |
| WO | 2007/015684 | 2/2007 |
| WO | 2010/052577 | 5/2010 |
| WO | 2011/081228 | 7/2011 |

OTHER PUBLICATIONS

International Search Report for international application No. PCT/CN2011/079288, dated Jun. 14, 2012 (4 pages).
Written Opinion for international application No. PCT/CN2011/079288, dated Jun. 14, 2012 (4 pages).

* cited by examiner

*Primary Examiner* — Stuart Hendrickson
(74) *Attorney, Agent, or Firm* — Hamre, Schumann, Mueller & Larson, P.C.

(57) ABSTRACT

The invention relates to a method for carbonizing carbon dioxide, comprising the step of contacting carbon dioxide with a solution of chelating agent or a solution of substance which exhibits chelating properties under dynamic conditions to generate oxygen and carbon particles. The method of the invention is significantly more economical and convenient and do not cause harm to the environments. The invention also exhibits a novel and unique feature that elemental carbon and oxygen are generated as final products under normal room temperature and atmosphere, and the carbon can be recovered as an energy source.

18 Claims, 3 Drawing Sheets

METHOD FOR CARBONIZING CARBON DIOXIDE AND APPLICATION THEREOF

FIELD OF THE INVENTION

The present invention relates to a method for carbonizing carbon dioxide, and more particularly, to a method for converting carbon dioxide into elemental carbon under room temperature and atmospheric condition, without requiring high external energy input.

BACKGROUND OF THE INVENTION

Carbon dioxide ($CO_2$) is a major greenhouse gas produced by human activities, primarily through the combustion of fossil fuels, for instance, to run vehicles (petrol, diesel and kerosene), heat homes, businesses and power factories. The concentration of carbon dioxide in the earth's atmosphere has risen drastically in the past decades, which is considered as a major factor contributing to global warming.

Presently, there is no practical solution for $CO_2$ emission problem in industries. The process for removing $CO_2$ known in the art is carbon capture and storage (CCS) in which $CO_2$ is captured by for example chemicals such as monoethanolamine (MEA), compressed and buried underground. However, in this process, the storage problem for $CO_2$ needs to be solved. It is recognized that $CO_2$ emission is in the order of trillion tons annually, and storing such a huge amount of the gas $CO_2$ is costly and problematic. Another disadvantage of the CCS process is that the buried $CO_2$ cannot be reused.

There are other processes such as using chemical neutralization or absorption for the removal of $CO_2$, but disposal of final products from these processes is a crucial issue. Therefore, the above processes cannot be considered as practical solutions for the removal of $CO_2$.

The processes and systems in the prior art discussed above are not able to re-utilize the gas $CO_2$, and the disposal of final products thereof creates another issue.

To effectively remove $CO_2$, the invention provides a method that is capable of carbonizing $CO_2$ into black elemental carbon under room temperature and atmospheric conditions, which makes $CO_2$ a renewable energy. Consequently, the invention not only provides the most practical solution to the $CO_2$ emission problem without causing a harm to the atmosphere and the environments, but also paves the way for developing new energy sources, which has not been taught and suggested by any of the prior art reference documents.

SUMMARY OF THE INVENTION

The present invention has been developed to fulfill the needs noted above and therefore has a principle object of the provision of a method for removing carbon dioxide from air or the flue gas as a result of the combustion of fossil fuels, biomass, or other industrial processes such as coal gasification processes, de-carbonation of limestone and the like, which do not cause harm to the environments.

Another object of the invention is to provide a method for removing carbon dioxide which requires no high energy input and thus is significantly more economical and convenient than the processes and systems in the prior art.

A yet further object of the invention is to provide a method for removing carbon dioxide and converting the final products as energy sources.

These and other objects and advantages of the invention are satisfied by providing a method for carbonizing carbon dioxide, comprising the step of contacting carbon dioxide with a solution of chelating agent or a solution of substance which exhibits chelating properties under dynamic conditions to generate oxygen and carbon particles. Recovering carbon particles may be performed by any means known in the art, for example filtration or settling processes.

In preferred embodiments of the invention, the chelating agent is phosphate-based solutions selected from the group consisting of $Na_3PO_4$, $Na_2HPO_4$, $K_3PO_4$, $K_2HPO_4$ or their mixtures with carbonate-based solution. The chelating agent may also be selected from carboxylates or amines such as ethylenediaminetetraacetic acid (EDTA), diethylenetriaminepentaacetic acid (DTPA), propylenediaminetetraacetic acid (PDTA), nitrilotriacetic acid (NTA) or ethylenediaminedisuccinate (EDDS) etc.

The solution of chelating agent or the solution of substance which exhibits chelating properties may have a pH value of 3 to 14, preferably 10 to 13. The solution of chelating agent or the solution of substance which exhibits chelating properties may be present at a concentration of 0.2 to 75% by weight, preferably 15 to 30% by weight.

The contact between the gas carbon dioxide and the solution may be performed under basic condition, preferably at the pH value of 8 to 14, if the chelating agent or the substance which exhibits chelating properties in water is alkaline. It has been found by the inventor that, in that case, if the solution has a concentration of 2-50% and a pH of 8-14, the carbon particles of nanometer magnitude may be generated.

The contact between the gas carbon dioxide and the solution may also be performed under acidic condition, preferably at the pH value of 2 to 6, if the chelating agent or the substance which exhibits chelating properties in water is acidic. It has been found by the inventor that, in that case, if the solution has a concentration of 0.5-10% and a pH of 3-5, the carbon particles of nanometer magnitude may be generated.

According to the invention, the dynamic conditions may be created or induced by actions selected from cavitations, compression, expansion, venturi, orifice, linear or spiral spray, jets, screen, mist spraying or bubbling.

Carbon dioxide may contact with the solution of chelating agent or the solution of substance which exhibits chelating properties in a counter flow, co-current flow, or cross flow direction.

It has been found that, if the solution of chelating agent or the solution of substance which exhibits chelating properties is subjected to a pulsed electromagnetic wave treatment, more elemental carbon particles can be produced. In this regard, the electromagnetic wave treatment may be applied by use of a device for generating an electromagnetic field which has a time varying low frequency. The electromagnetic wave may have a frequency in the range of 500 Hz to 5 MHz.

To reactivate and maintain the chelating properties of the solution of the method, the solution of chelating agent or the solution of substance which exhibits chelating properties may be regenerated. The regeneration may be carried out by addition of an alkaline solution into the solution, electrolyzing the solution, subjecting the solution to pulsating wave electrolysis, electrostatic charge cloud reactivation, or any combination thereof.

If necessary, the contacting step of the method can be repeated for one or more times.

Another aspect of the invention relates to use of carbon dioxide or carbonate-based compounds as a source for producing carbon and oxygen, wherein naturally occurring carbon dioxide or carbon dioxide generated from the carbonate-based compounds are subjected to the method according to the invention.

In contrast to the processes and systems available in the prior art, the method of the invention for carbonizing carbon dioxide is capable of reducing carbon dioxide into its elemental state. Therefore, there is no need for disposal of final products and considering storage of $CO_2$.

The most advantage of the invention is the generation of elemental carbon and oxygen which can be recovered and reused again for combustion. This improves drastically the energy production efficiency for any carbon-based fuels. With such a recovery of energy, all carbonate-based substances such as minerals, limestone, dolomites or the like, including bicarbonates and carbonates present in the seawater or freshwater can be treated as an energy source. When their carbonate contents are converted into $CO_2$ by acid treatment, the gas $CO_2$ produced is then used for conversion into elemental carbon and oxygen. A further advantage of the invention is that the method of the invention can result in generation of a large amount of nano carbon particles.

In addition to the elemental carbon produced in the method of the invention, the oxygen gas produced is also another valuable product for many practical industrial applications.

Since the method of the invention can result in the generation of a large amount of nano carbon particles, the invention is also a good process for nano carbon production.

The objects, characteristics, advantages and technical effects of the invention will be further elaborated in the following description of the concepts and structures of the invention with reference to the accompanying drawings. The drawings illustrate the invention by way of examples without limitation to the invention in any manner.

DETAILED DESCRIPTION OF THE INVENTION

While this invention is illustrated and described in preferred embodiments, the invention may be produced in many different configurations, sizes, forms and materials.

Figure 1:
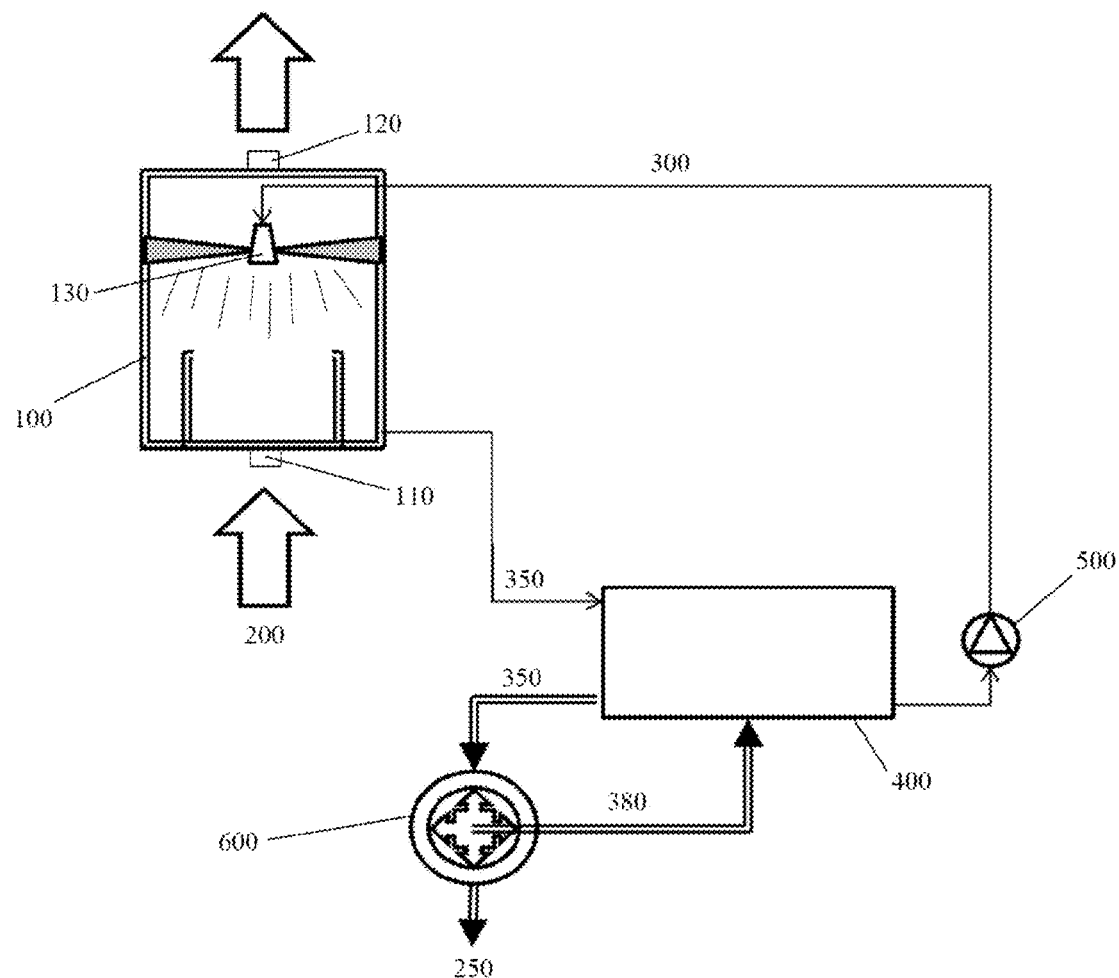
FIG. 1 is a schematic diagram showing a method constructed according to a first embodiment of the invention.

Referring now to the drawings, FIG. 1 illustrates a schematic diagram of the method constructed consistent with a first preferred embodiment of the present invention. In this embodiment, 20% by weight of $Na_3PO_4$ aqueous solution is used as the chelating agent that is in contact with $CO_2$. Other substances having good chelating property are possible for use in the invention. For example, carboxylates, phosphates and amines including ethylenediaminetetraacetic acid (EDTA) are typical chelating agents. It should be note that different chelating agents has different operating pH range and their optimum range may be determined on site to suit the actual application condition and constraint. In general, the contact between the gas carbon dioxide and the solution may be performed under basic condition, preferably at the pH value of 8 to 14, if the chelating agent or the substance which exhibits chelating properties in water is alkaline; the contact between the gas carbon dioxide and the solution may also be performed under acidic condition, preferably at the pH value of 2 to 6, if the chelating agent or the substance which exhibits chelating properties in water is acidic. For example, the phosphate based agent will operate at high alkaline level whereas EDTA is able to operate even at acidic condition. In addition, the acidic chelating agent may operate under basic condition in the method of the invention, for example, sodium hydroxide may be added into the EDTA solution to bring the pH thereof to as high as 13 where the EDTA is still able to capture the carbon.

In particular, the gas $CO_2$ 200 enters a spray tower 100 via a gas inlet 110 located at the bottom of the spray tower 100 and passes upward. The $Na_3PO_4$ solution 300 is stored in a tank 400 and fed into the upper part of the spray tower 100 by a circulating pump 500. Although FIG. 1 illustrates a nozzle for the simplicity, it should be understood that many nozzles 130 are placed across the spray tower 100 at different heights to spray the $Na_3PO_4$ solution 300 downward to come into contact with carbon dioxide rising upward from the gas inlet 110. As can be seen, carbon dioxide 200 is contacted with the $Na_3PO_4$ solution 300 in a counter flow direction. It would be noted that the $Na_3PO_4$ solution 300 can be fed in a co-current flow or cross flow direction relative to the flow of carbon dioxide.

In the spray tower 100, the gas $CO_2$ is reduced drastically with the generation of fine carbon particles and oxygen. The results reveal that the conversation rate of $CO_2$ into elemental carbon may vary from 10% to 70% depending on the number of stages applied in the method. The carbon particles are found in the contacted $Na_3PO_4$ solution 350, and come out of the spray tower 100 with the contacted $Na_3PO_4$ solution 350 and enter into the tank 400. The gas after the $Na_3PO_4$ treatment exits via a gas outlet 120 on the top of the spray tower 100 and is collected.

The carbon containing $Na_3PO_4$ solution 350 is transported to a carbon collector 600 for collection of elemental carbon particles. The carbon collector 600 may be a separator of any type that allows the separation of the carbon particles 250 from the $Na_3PO_4$ solution, for example, a filter or a decanter. The separated $Na_3PO_4$ solution 380 is then transported back to the tank 400 for circulating use.

Typically, the pH of the $Na_3PO_4$ solution is in the range of 8-14, preferably 10-12. The basic conditions are necessary for the effective carbonization of the invention, when $Na_3PO_4$ is used as the chelating agent. In this embodiment, the $Na_3PO_4$ solution is selected to ensure the pH of the solution at a high pH level to reach the desired pH range for better $CO_2$ reduction. If the pH of the solution is not high enough, it may be corrected by other alkaline solution to increase the pH of the solution. It has been observed that not all $CO_2$ will be converted into elemental carbon, and side reactions take place, for example, a portion of $CO_2$ will be converted into carbonic acid, eventually causing the solution in the spray tower to become more acidic. This will reduce the pH of the solution and the carbon capture efficiencyand thereby reducing the reacting sites created by $Na_3PO_4$, with a result of decreased rate of the $CO_2$ removal. Thus, the pH of the $Na_3PO_4$ solution can be used as an indicator for controlling the pH hence the overall $CO_2$ removal efficiency.

In order to ensure the high $CO_2$ removal and conversion rate, the pH of the solution flowing in the spray tower 100 shall be maintained at a higher level. In this case, the $Na_3PO_4$ solution is basified to the desirable high pH by regeneration through addition of an alkaline solution such as NaOH or $Na_3PO_4$ into the $Na_3PO_4$ solution, electrolyzing the $Na_3PO_4$ solution, subjecting the $Na_3PO_4$ solution to pulsating wave electrolysis, electrostatic charge separation, or any combination thereof. In this way, the OH— ions are introduced into the $Na_3PO_4$ solution to correct or maintain the pH to/at its original pH level. The electrolysis or the charge separation can be either carried out via side stream or in tank or inline electrolysis. The cathode and anode used in the electrolysis methods may be enclosed with or without the ions membrane or ion barrier materials for increasing the OH— ions in the main bulk solution.

In the prior art, the standard reaction for $CO_2$ in contact with $Na_3PO_4$ is to produce sodium carbonate, and such reaction takes place under equilibrium and non-dynamic conditions where $CO_2$ cannot be broken down into black elemental carbon. As opposed to the prior art, $CO_2$ and the $Na_3PO_4$ solution in the method of the invention are under dynamic motion conditions. Such motion of the solution and the gas can be created by any means known in the art, for example induced by cavitations, compression, expansion, venturi, orifice, linear or spiral spray, jets, screen or mist spraying, bubbling or other forms of actions. It is possible that one of the solution and the gas is in stationary condition.

It is believed that, in the method of the invention, the $Na_3PO_4$ solution serves as a chelating agent and also acts as a catalyst rather than as a reactant to remove and capture the $CO_2$ under dynamic conditions, for instance, under the spray or bubbling/cavitations effect. Here, the main chemical reactions in the spray tower 100 occur as follows:

$$CO_2(g) \rightarrow C(s) + O_2(g) \qquad \text{a)}$$

$$CO_2(g) \rightarrow C^{4+} + 2O^{2-} \text{(ion form)} \qquad \text{b)}$$

Figure 3:
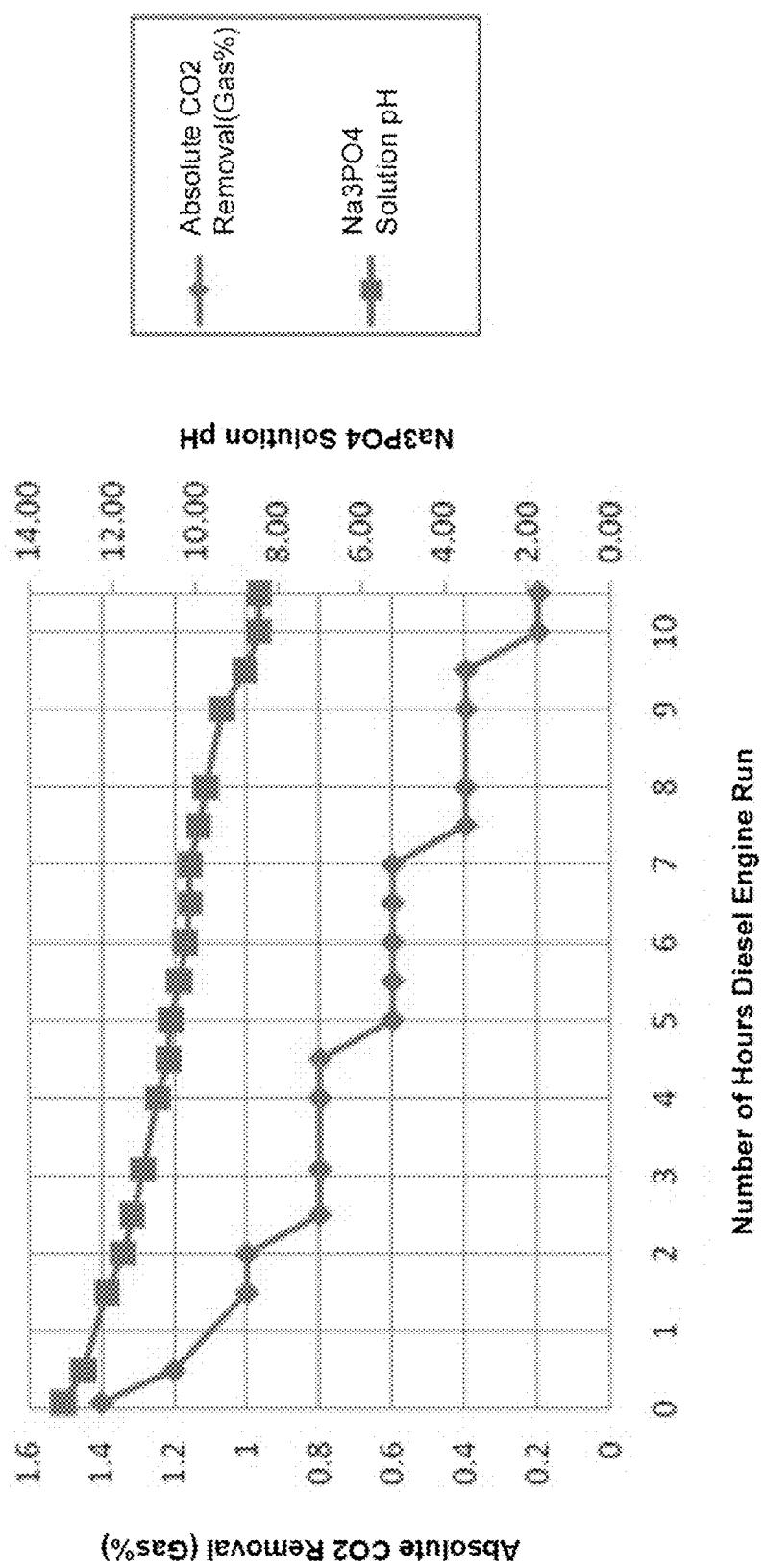
FIG. 3 is a chart showing the correlation of the removal efficiency of carbon dioxide to the pH value of $Na_3PO_4$ solution.

These two reactions can both take place simultaneously. It has been observed that higher pH of the solution favors reaction (a) and lower pH favors reaction (b). FIG. 3 illustrates the correlation of the removal efficiency of carbon dioxide to the pH value of $Na_3PO_4$ solution. As illustrated, at high pH level, such as pH >12, reaction (a) produces more carbon particle in the process which can be collected and also there is proportionate increase of $O_2$ by volume after the $Na_3PO_4$ treatment. At low pH level, such as 8~9, both $C^{4+}$ and $O^{2-}$ ions exist in the solution, less carbon is collected and less oxygen increase is measured.

The spraying of the $Na_3PO_4$ solution in the spray tower enables to create a good contact for the $CO_2$ gas reduction to take place. The spray rate is relating to the tower diameter, nozzle design and the rated value of the nozzles to ensure the good contact between the solution and the gas. The flow rate of the $Na_3PO_4$ solution will then be sized according to these hardware and gas/solution contact requirements.

The concentration of the $Na_3PO_4$ solution is a second factor that affects the $CO_2$ removal. For a typical flue gas with $CO_2$ content of 2.5-16%, the concentration of the $Na_3PO_4$ solution of 3 up to 75% can be used. The higher the concentration of the $Na_3PO_4$ solution, the more efficient recovery of elemental carbon particles. However, this has to take into account the cost of the $Na_3PO_4$ added and the concentration of $CO_2$ in the flue gas. With the addition of 3 to 75% of the $Na_3PO_4$ solution, its pH value will vary from 8-14 approximately at the start. The concentration of the $Na_3PO_4$ solution used in the method of the invention is preferably in the range 2% to 50% by weight, preferably 15 to 30% by weight. With 20% of the $Na_3PO_4$ solution, the $CO_2$ removal rate can be as high as 80% in a cavitations column.

The size of elemental carbon produced in the method of the invention is affected by the solution concentration and pH. In the case that the $Na_3PO_4$ solution has a high concentration, carbons of larger particle size are obtained; in the case that the $Na_3PO_4$ solution has a low concentration especially at a lower pH, carbons of finer particle size, for instance, in the nano scale will be collected. In this embodiment, the carbon particles of nanometer magnitude are found in the contacted $Na_3PO_4$ solution 350, when in the $Na_3PO_4$ solution 300 is present at a concentration of 2-50%, and has a pH of 8-14.

It is surprisingly observed that the $Na_3PO_4$ solution, after being subjected to a treatment of electromagnetic field including pulsated electromagnetic wave ranging from ultra low frequency wave to ultra violet light, would increase the removal of $CO_2$, and carbon particles of nano size to carbon particles of visible large micron size (which may vary from 50 micrometer to below 100 nanometer) are seen to be precipitated. The size of carbon particles and the rate of precipitation can be controlled by the concentration of the $Na_3PO_4$ solution and/or the charging electromagnetic wave. The wave forms, frequency, strength, pulsating frequency will affect the precipitation rate. The electromagnetic wave frequency applied to the $Na_3PO_4$ solution would typically be between 500 Hz-5 MHz. The electromagnetic waveform strength (i.e. amplitude) would result in high excitation of the $Na_3PO_4$ solution to reach a resonance response, and accordingly the precipitation mechanism would reach a resonant level to enhance the conversion of $CO_2$.

Therefore, a device (not shown) for generating an electromagnetic field which has a time varying frequency may be placed in the $Na_3PO_4$ solution tank 400 to energize the $Na_3PO_4$ solution, The device may consists of a coil wrapped around a piece of pipe. The coil is connected to a separate panel from the $Na_3PO_4$ solution 300 by applying a time varying low frequency electromagnetic field to the solution surrounding the device. The details of the device for generating the electromagnetic wave may make reference to the PCT application no. PCT/SG2006/000218. The energized $Na_3PO_4$ solution is sprayed downward to directly contact with the gas $CO_2$ rising upward from the bottom of the spray tower 100. Alternatively, an electromagnetic wave generator (not shown) in the form of emitters connected to the driver card directly or via an inductor coil may be placed inside the pipeline between the spray tower 100 and the tank 400 to apply the electromagnetic wave to the $Na_3PO_4$ solution flowing therethrough.

To provide better efficiency of the conversion of $CO_2$ into carbon, multiple stages of the spray tower may be used. The multiple stages of the tower can be provided in a single tower, or separate vessels arranged in horizontal relation, each dedicated to a specific stage or set of stages, may be used.

Figure 2:
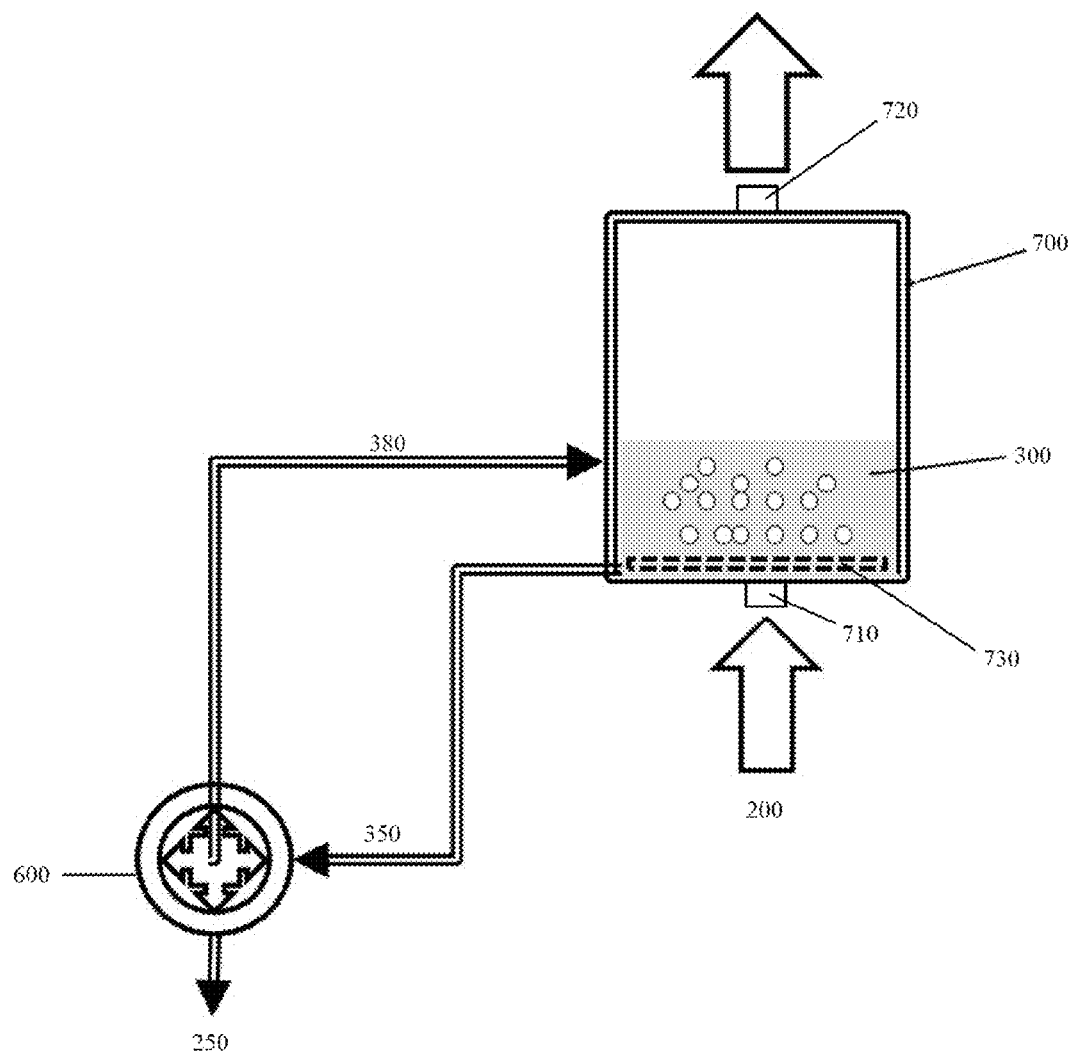
FIG. 2 is a schematic diagram showing a method constructed according to a second embodiment of the invention.

Instead of using the spray tower 100, a bubbling column can be used in the method of the invention. FIG. 2 illustrates a schematic diagram showing the method of the invention using the bubbling column. As illustrated, the gas $CO_2$ 200 enters the bubble column 700 via a gas inlet 710 located at the bottom thereof. The $Na_3PO_4$ solution 300 is stored in the column 700. A diffuser 730 is arranged at the bottom of the interior of the column 700 to continuously cause a turbulent stream to enable an optimum contact between the gas $CO_2$ and the $Na_3PO_4$ solution 300 for the generation of the carbon particles. Like the first embodiment discussed above, the carbon particles are carried in the $Na_3PO_4$ solution 350 that flows out at the bottom of the column 700. The gas after the $Na_3PO_4$ treatment exits via a gas outlet 720 on the top of the bubble column 700 and is collected.

The carbon containing $Na_3PO_4$ solution 350 is directly transported to a carbon collector 600 for collection of elemental carbon particles. Likewise, the carbon collector 600 may be a filter or decanter that allows the separation of the carbon particles 250 from the $Na_3PO_4$ solution. The separated $Na_3PO_4$ solution 380 is then transported back to the bubbling column 700 for circulating use.

Obviously, the invention is characterized in that $CO_2$ is removed by reduction to its elemental state under normal room temperature and atmosphere, with the generation of carbon particles and the gas oxygen. The method of the invention requires no high external energy input for the removal of the gas $CO_2$. It is believed that the chelating agent solution with strong chelating including those substances which exhibit chelating properties, high pKa constant and strong buffer capability, such as $Na_3PO_4$, $K_3PO_4$, $K_2HPO_4$, $Na_2HPO_4$, EDTA or the like, has a catalytic function to lower the energy required for $CO_2$ breaking as well as capturing the elemental carbon in the solution. Simultaneously, the dynamic motion of the solution, such as bubbling or spraying actions, helps to release the media internal energy, thereby causing the $CO_2$ carbonization to take place in the solution at normal room temp, atmospheric condition.

In the conventional processes for removing $CO_2$, for example, using NaOH for removing $CO_2$, a large amount of NaOH is required and the disposal of the final products is also an issue. While according to the invention, the majority of the gas $CO_2$ is converted into elemental carbon and oxygen, and no chemical is used and the disposal of the final products does not exist in the invention. More importantly, the final products of the invention, carbon and oxygen, can be recovered. Therefore, $CO_2$ can be treated as a renewable energy.

Based on the method of the invention, the gas $CO_2$ which occurs naturally or is produced chemically, or carbonate-based compounds such as minerals, limestone, dolomites and the like all can serve as an energy source to recover oxygen and carbon. For example, if carbonate minerals are taken as an energy source, then seawater may be electrolyzed by a separator such as membrane. The acid produced electrolytically can be used to treat the carbonate minerals to generate $CO_2$, which is then treated by the method of the invention to recover carbon and oxygen. And if concentrated $CO_2$ is obtained from the $CO_2$ capturing methods such as MEA amine method, then high contents of carbon and oxygen would be obtained by the method of the invention.

Thus, the present invention provides a method which continuously and effectively removes the greenhouse gas $CO_2$. By the re-generation of the chelating agent solution, the method of the invention is sustained to be continual. The invention is significantly more economical and convenient and does not cause harm to the environments. When compared with the processes and systems in the prior art, the invention exhibits a novel and unique feature that elemental carbon and oxygen are generated as final products and can be recovered as an energy source. The invention not only solves the storage problem associated with the $CO_2$ capturing technologies, but also eliminates the need of using chemicals required in the prior processes and the need of disposal of final products.

Having sufficiently described the nature of the present invention according to some preferred embodiments, the invention, however, should not be limited to the structures and functions of the embodiments and drawings. It is stated that insofar as its basic principle is not altered, changed or modified it may be subjected to variations of detail. Numerous variations and modifications that are easily obtainable by means of the skilled person's common knowledge without departing from the scope of the invention should fall into the scope of this invention.

What is claimed is:

1. A method for carbonizing carbon dioxide, comprising:
    exciting a solution of chelating agent or a solution of substance which exhibits chelating properties by subjecting the solution of chelating agent or the solution of substance which exhibits chelating properties to a pulsed electromagnetic wave treatment to a resonant level;
    contacting carbon dioxide with the solution of chelating agent or the solution of substance which exhibits chelating properties under dynamic conditions thereby generating oxygen and carbon particles; and
    recovering the carbon particles and collecting oxygen.

2. The method according to claim 1, wherein the chelating agent is phosphate-based solutions, carboxylates, or amines.

3. The method according to claim 2, wherein the chelating agent is selected from the group consisting of $Na_3PO_4$, $Na_2HPO_4$, $K_3PO_4$, $K_2HPO_4$, and/or their mixtures with carbonate-based solution.

4. The method according to claim 2, wherein the chelating agent is selected from the group consisting of ethylenediaminetetraacetic acid (EDTA), diethylenetriaminepentaacetic acid (DTPA), propylenediaminetetraacetic acid (PDTA), nitrilotriacetic acid (NTA) or ethylenediaminedisuccinate (EDDS).

5. The method according to claim 1, wherein the solution of chelating agent or the solution of substance which exhibits chelating properties has a pH value of 3 to 14.

6. The method according to claim 5, wherein the contacting is performed under basic condition at the pH value of 8 to 14, if the chelating agent or the solution of substance which exhibits chelating properties is alkaline.

7. The method according to claim 6, wherein the solution of chelating agent or the solution of substance which exhibits chelating properties has a concentration of 2 to 50% chelating agent or substance which exhibits chelating properties by weight and a pH of 8 to 14, resulting in the generation of carbon particles of nanometer magnitude.

8. The method according to claim 5, wherein the contacting is performed under acidic condition at the pH value of 2 to 6, if the chelating agent or the solution of substance which exhibits chelating properties is acidic.

9. The method according to claim 8, wherein the solution of chelating agent or the solution of substance which exhibits chelating properties has a concentration of 0.5 to 10% chelating agent or substance which exhibits chelating properties by weight and a pH of 3 to 5, resulting in the generation of carbon particles of nanometer magnitude.

10. The method according to claim 1, wherein the solution of chelating agent or the solution of substance which exhibits chelating properties is present at a concentration of 0.2 to 75% by weight.

11. The method according to claim 10, wherein the concentration is 15 to 30% by weight.

12. The method according to claim 1, wherein the dynamic conditions are created by actions selected from cavitations, compression, expansion, venturi, orifice, linear or spiral spray, jets, screen, mist spraying or bubbling.

13. A method for producing carbon and oxygen using carbon dioxide or carbonate-based compounds as a source, comprising the step of subjecting naturally occurring carbon dioxide or carbon dioxide generated from the carbonate-based compounds to the method according to claim 1.

14. The method according to claim 13, wherein the carbonate-based compounds are selected from the group consisting of bicarbonates, carbonates, carbonate minerals, limestone, and dolomites.

15. The method according to claim 1, wherein the electromagnetic wave treatment is applied by use of a device for generating an electromagnetic field which has a time varying low frequency.

16. The method according to claim 1, wherein the electromagnetic wave has a frequency in the range of 500 Hz to 5 MHz.

17. The method according to claim 1, further comprising regenerating the solution of chelating agent or the solution of substance which exhibits chelating properties to reactivate and maintain the chelating properties of the solution.

18. The method according to claim 17, wherein the regeneration is carried out by addition of an alkaline solution into the solution, electrolyzing the solution, subjecting the solution to pulsating wave electrolysis, electrostatic charge cloud reactivation, or any combination thereof.

\* \* \* \* \*